United States Patent Office 3,012,851
Patented Dec. 12, 1961

3,012,851
METHOD OF PRODUCING AMMONIUM AZIDE
Joseph W. Lawrence and Norman M. Junk, Tamaqua, Pa., assignors to Atlas Chemical Industries, Inc., a corporation of Delaware
No Drawing. Filed Oct. 23, 1958, Ser. No. 769,081
10 Claims. (Cl. 23—101)

The present invention relates to a new and useful method for the manufacture of ammonium azide.

The process of the present invention includes the steps of heating and reacting together nitrous oxide and ammonia in the presence of a hydrogenation catalyst to produce a reaction product comprised of ammonium azide, water, unreacted ammonia and nitrogen. The reaction product is next treated, under the conditions more fully hereinafter disclosed, to recover the ammonium azide.

The vapor phase reaction between nitrous oxide and ammonia to produce ammonium azide may be represented as shown in Equation 1:

(1)    $N_2O + 2NH_3 \rightarrow NH_4N_3 + H_2O$

A second reaction taking place among the two reacting gases of Equation 1 may be represented as shown in Equation 2:

(2)    $N_2O + 2NH_3 \rightarrow 2N_2 + 2H_2 + H_2O$

The reaction shown in Equation 2 is highly exothermic and can assist in furnishing the high temperatures which promote the yield of ammonium azide. However, the nitrous oxide reacting in Equation 2 is neither recovered nor reacted into a useful product. Therefore, it is economically desirable to use reaction conditions which will keep Reaction 2 at a minimum.

The temperature range through which Reaction 1 takes place is relatively high. It is essential that the temperature at which the reaction takes place be sufficiently high to cause the reaction to proceed, but it should not be high enough to cause decomposition of the formed ammonium azide product. The reaction producing ammonium azide proceeds at a temperature of about 950° F. Reaction temperatures greater than about 1600° F. tend to cause the nitrous oxide and ammonium starting materials to react according to Reaction 2 and also cause a decomposition of the ammonium azide formed.

The effective pressure conditions under which Reaction 1 may be effectively carried out vary over a rather wide range. The operative pressure should be at least 1 atmosphere and preferably the pressure is superatmospheric. The reaction products of Equation 1 occupy the smaller volume side of the equation demonstrating the fact that the reaction tends to be driven further to the right by an increase in pressure. Conversely, the reaction products of Equation 2 occupy the larger volume side of the equation demonstrating the fact that an increase in pressure would tend to retard the reaction. Thus, the herein described process is preferably carried out under superatmospheric pressure conditions.

As indicated in Equation 1 the reaction in the vapor state between nitrous oxide and ammonia takes place in the stoichiometric ratio of 1:2. If mol ratios of greater than 1:2 are used the product yield is markedly reduced. Nitrous oxide-ammonia mixtures having a large excess of ammonia may be used and provide reaction mixtures relatively free of hazard. While high ammonia to nitrous oxide mixtures are not detrimental to the reaction, the fact that the excess ammonia greatly enlarges the reaction chamber needed must be taken into consideration in the economics of the process on a commercial basis. Although the mol ratio of nitrous oxide to ammonia may be varied over a wide range, it is preferred to use mol ratios in the neighborhood of ⅓ of the 1:2 stoichiometric ratio. Usually ratios of nitrous oxide to ammonia of from about 1:5 to about 1:7 may be advantageously used.

While hydrogenating catalysts in general are operative in this process, it is preferred that the catalysts be chosen from chromium and the metals of group VIIIb of the periodic table (namely iron, cobalt and nickel) or derivatives thereof. Suitable catalysts for use in the described process include oxides of hydrogenating metals, such as chromium oxide, cobaltous oxide, nickel oxide, ferric oxide and the like. The catalysts may be used in either a fixed or fluid bed and may be used either in a finely divided state or supported on porous and inert carriers such as alumina, pumice, kieselguhr and the like, or on synthetic carriers such as silica gel or alumina gels. Commercially available catalysts and catalyst carriers such as silica-alumina or chromia-alumina pellets are suitable for use in this process.

The contact time between the nitrous oxide-ammonia reactants and the catalyst is preferably maintained for a period of between about 3 and 5 seconds, although a contact time varying between about 0.1 and 10 seconds may also be successfully used to effect the production of ammonium azide. Contact times without the above-mentioned range were found to either reduce the product yield or cause the reaction to stop.

As used herein and in the following examples the term "contact time" between the nitrous oxide-ammonia reactants and a catalyst may be calculated by the use of the following mathematical reaction:

$$\frac{\text{Volume of catalyst at 70° F.}}{\text{Total volume of gas/second at 70° F.}}$$

In the following examples gaseous nitrous oxide and ammonia were first passed through metering devices and then mixed. The gas mixture was then admitted into a preheating chamber of a reaction furnace. After preheating the gas mixture was passed through the reaction zone of the furnace and exposed to a hydrogenation catalyst located therein. The temperature of the furnace was determined by means of a thermocouple imbedded in the hydrogenation catalyst. After the gases were passed through the reaction zone, they were removed from the furnace and allowed to cool slightly in order to condense solid ammonium azide in the walls of the conducting vessel. Then the cooled gases were passed through an ice water bath to condense the reaction products. After the run was completed, the water was evaporated from the bath. The ammonium azide which remained was collected and added to the ammonium azide which had been collected from the sides of the conducting vessel.

The following examples demonstrate the conditions of flow, temperature, contact time and catalyst under which nitrous oxide and ammonia may be reacted to form ammonium azide.

In Examples 1 and 2 of the following table the catalyst used was 16% Ni (reduced) on 3/16" silica-alumina pellets.

TABLE I

| Example | 1 | 2 |
|---|---|---|
| Ml. $N_2O$/min. at 70° F | 202 | 100 |
| Ml. $NH_3$/min. at 70° F | 250 | 600 |
| Contact time in seconds | 3.8 | 2.7 |
| Temperature, ° F | 1,020 | 1,020 |
| $NH_4N_3$ yield, percent | 1.0 | 1.4 |

*Example 3*

A run was made similar to that reported in Example 1 except that 3/16" chromia-alumina pellets were used in place of the carried nickel catalyst. The reaction proceeded smoothly but with reduced yield.

The reaction products from the above reaction are ammonium azides, water, nitrogen, hydrogen, unreacted amomnia and nitrous oxide. Ammonium azide condenses into a solid form at a temperature higher than 212° F., therefore, the ammonium azide product may be collected in an anhydrous form by cooling the product gas mixture to a point just above the boiling point of water.

If desired another method of recovery may be used if the ammonium azide product is desired in an aqueous solution. Advantage is taken of the high solubility of ammonium azide in water. In this method the product gas mixture is passed through a gas scrubbing device and the ammonium azide collected in a water bath.

A preferred recovery method involves the use of a cold trap maintained at about −70° F. A low temperature in the −70° range may be maintained by surrounding the cold trap vessel with a suitable refrigerant such as a Dry Ice-acetone mixture. An advantage of the cold trap method is that after the ammonium azide has been recovered, the unreacted ammonia may be condensed at the low temperature of the cold trap and recycled back to the reaction area and used to produce more ammonium azide.

The presence of ammonium azide was identified as the product of each of the tests outlined in Table I. By the addition of sodium hydroxide to an aqueous solution of the product and observing the evolution of $NH_3$, the presence of the ammonium radical in the molecule was demonstrated. The azide portion of the compound was proved by the silver nitrate test described on page 215 of Feigl, Spot Tests (3d Ed.), Houston, Texas, Elsevier Pub. Co., 1947.

Modifications of the invention other than as described in the foregoing description will be readily apparent to those skilled in the art and are included within the invention as defined in the appended claims.

What is claimed is:

1. A method of producing ammonium azide which comprises reacting a gaseous mixture of nitrous oxide and ammonia in the presence of a hydrogenation catalyst selected from the group consisting of chromium, iron, cobalt, nickel, and their oxides, under temperature conditions of from 950° F. to 1600° F. and recovering the formed ammonium azide product from the reaction mixture.

2. The method as described in claim 1 wherein the hydrogenation catalyst is selected from the group consisting of chromium, iron, cobalt, nickel and their oxides, with a carrier.

3. The method as described in claim 1 wherein the hydrogenation catalyst is nickel on silica-alumina pellets.

4. The method described in claim 1 wherein the formed ammonium azide product is recovered by a cold trap.

5. The method described in claim 1 wherein the formed ammonium azide product is recovered by passing the reaction mixture into water.

6. A method for the production of ammonium azide which comprises reacting nitrous oxide and ammonia in a vaporous state in the presence of a hydrogenation catalyst selected from the group consisting of chromium, iron, cobalt, nickel and their oxides, under temperature conditions of from 950° F. to 1600° F. and under superatmospheric pressure conditions, and recovering the formed ammonium azide product.

7. The process as described in claim 6 wherein the catalyst is maintained in contact with said reactants for a period of between 0.1 and about 10 seconds.

8. A method for the manufacture of ammonium azide which comprises the steps of reacting gaseous nitrous oxide and ammonia in a mol ratio of at least 1:1 in the presence of a hydrogenation catalyst selected from the group consisting of chromium, iron, cobalt, nickel, and their oxides, under temperature conditions of from 950° F. to 1600° F. and under superatmospheric pressure conditions, and recovering the formed ammonium azide from the reaction mixture.

9. The method of producing ammonium azide which comprises reacting a vaporous mixture of nitrous oxide and ammonia in the presence of a hydrogenation catalyst selected from the group consisting of chromium, iron, cobalt, nickel, and their oxides, under high temperature and superatmospheric pressure conditions to obtain a reaction mixture containing ammonium azide and separating said ammonium azide from the reaction mixture.

10. The method described in claim 9 wherein the ammonium azide is separated from the reaction mixture by cooling said mixture to about minus 70° F., recovering unreacted ammonia and returning said unreacted ammonia to the first mentioned reaction step.

References Cited in the file of this patent

Mellor: "Comprehensive Treatise on Inorganic and Theoretical Chemistry," Longmans, Green and Co., N.Y., 1928, vol. VIII, pages 344, 345.